United States Patent
Nevshupa et al.

(10) Patent No.: US 8,790,600 B2
(45) Date of Patent: Jul. 29, 2014

(54) SAMPLE-SUPPORT ELEMENT FOR ULTRA-HIGH VACUUMS

(75) Inventors: Roman Nevshupa, Eibar (ES); Marcello Conte, Eibar (ES); Andoni Delgado Castillo, Eibar (ES); Camillus Petrus Domi Van Rijn, Eibar (ES)

(73) Assignee: Fundacion Tekniker (ES)

( * ) Notice: Subject to any disclaimer, the term of this patent is extended or adjusted under 35 U.S.C. 154(b) by 0 days.

(21) Appl. No.: 13/643,581

(22) PCT Filed: Apr. 29, 2010

(86) PCT No.: PCT/ES2010/070273
§ 371 (c)(1), (2), (4) Date: Nov. 13, 2012

(87) PCT Pub. No.: WO2011/135111
PCT Pub. Date: Nov. 3, 2011

(65) Prior Publication Data
US 2013/0129583 A1    May 23, 2013

(51) Int. Cl.
*B01L 9/00*    (2006.01)

(52) U.S. Cl.
USPC ............ 422/561; 422/560; 422/565; 422/566

(58) Field of Classification Search
USPC .............................................. 422/560; 118/50
See application file for complete search history.

(56) References Cited

U.S. PATENT DOCUMENTS

| | | | |
|---|---|---|---|
| 5,811,762 A * | 9/1998 | Tseng | 219/385 |
| 6,074,610 A | 6/2000 | Huang | |
| 2004/0262155 A1 * | 12/2004 | Lombardi et al. | 204/298.01 |
| 2009/0084313 A1 * | 4/2009 | Ito | 118/50.1 |
| 2010/0000250 A1 | 1/2010 | Sixt | |

FOREIGN PATENT DOCUMENTS

| | | |
|---|---|---|
| EP | 0194727 A1 | 9/1986 |
| JP | 4062389 A | 2/1992 |

* cited by examiner

*Primary Examiner* — Natalia Levkovich
(74) *Attorney, Agent, or Firm* — Cantor Colburn LLP

(57) ABSTRACT

The invention discloses a sample-support element for ultra-high vacuums comprising a main chamber and a supplementary chamber for the sample holder and the heating/cooling elements, which is pumped by a related pump line. This enables the reduction or total elimination of the negative effect related to the alteration of the residual atmosphere in ultra-high vacuums resulting from heating or cooling the surfaces of the sample holder.

3 Claims, 2 Drawing Sheets

SAMPLE-SUPPORT ELEMENT FOR ULTRA-HIGH VACUUMS

TECHNICAL FIELD

The present invention is applied to the field of ultra-high vacuums. More specifically, it is related to a device for heating or cooling a sample of material or a component in ultra-high vacuums without altering the residual vacuum.

BACKGROUND OF THE INVENTION

In the present day there are different techniques of characterization of materials or surface coatings in ultra-high vacuums that require heating of the sample of material or coating at high temperatures (up to 1200° C.) or cooling at cryogenic temperatures. These applications include probe microscopy, scanning electron microscopy, thermal desorption spectroscopy, Auger electron spectroscopy, X-ray photoelectron spectroscopy, X-ray diffraction and others. There are also several technologies in electronics, optoelectronics, nano-technologies requiring heating or cooling of wafers of electronic materials or other components in their manufacturing process. As an example of these processes we can mention molecular beam epitaxy, dopant diffusion or oxide growth. In the patent EP0325178 the vacuum system consists of two different chambers: the main chamber and the chamber for sample introduction. The sample holder with the integrated heater and the sample installed is transferable from one chamber to another to exchange the samples without breaking the vacuum in the main chamber. However during its operation the heater is situated in the main chamber in the same evacuated volume as the sample or component to be heated. In the device described in patent JP10025570 the heater is located in an additional chamber separated from the main vacuum chamber by a valve. In this way the vacuum in the additional chamber does not break when the main chamber is vented to change the sample. However, when the sample or the component is heated by the heater, the heater is placed in the same evacuated volume as the sample or the component.

In these known devices, the heating or cooling system of the samples or the components fixed on the sample holder is placed in the same volume of the vacuum chamber as the sample itself. When the components of the heater and the bottom parts of the sample holder are heated, they emit the gases adsorbed on their surfaces or dissolved in the volume which produces an increase of the pressure in the vacuum chamber and a change of the composition of the waste gases. On the contrary, when cooled, the surfaces of the cooling system adsorb the gases and vapors in the vacuum chamber, involving the pressure drop, especially of the components of the residual vacuum with high condensing temperature. Therefore, an alteration of the pressure in the vacuum chamber and of the composition of the residual gases may occur as a result of the operation of the heating or cooling system of the sample holder in ultra-high vacuums. This alteration is undesirable in several techniques of characterization of materials and surfaces because it hinders the measurement of the gases that are given off from the sample of material or condense on the surface of the sample. Moreover, the gases given off from the heating system of the sample can contaminate the surface of the sample or the component that is intended to be characterized or modified, or the sensitive surfaces of several devices located in the vacuum chamber. Among the techniques and technologies in which the contamination of ultra-high vacuums with the gases given off from the sample holder can be important are: growth of the coatings by molecular beam epitaxy, X-ray photoelectron spectroscopy, Auger electron spectroscopy, thermal desorption, electron beam induced desorption, ions, radiation or mechanical action, atomic force microscopy, nanotechnologies, etc.

BRIEF SUMMARY

The invention enables the reduction or totally elimination of the negative effect related to the alteration of the residual atmosphere in ultra-high vacuums resulting from heating or cooling the surfaces of the sample holder.

To this end, the invention discloses the use of a supplementary chamber inside the ultra-high vacuums chamber. The sealing between the sample holder and the supplementary chamber has to prevent the cold or heat transmission from the sample holder to the additional chamber. A labyrinth-type seal between the sample holder and the supplementary chamber without direct contact between the wall of the supplementary chamber and the cold or hot surfaces of the sample holder or a seal of low thermal conductivity material and preferably low gas desorption rate is used to this end.

The sample-support element for ultra-high vacuums according to the invention is formed by an ultra-high vacuums chamber, a supplementary chamber located inside the ultra-high vacuums chamber, a sample holder and elements for heating or cooling a sample. The sample holder is surrounded by the supplementary chamber so that the volume of the ultra-high vacuums chamber is exposed only to the top surface of the sample holder where the sample is placed and the means for heating or cooling the sample are encapsulated inside the supplementary chamber. The supplementary chamber and the top surface of the sample holder are connected through low thermal conductivity material gaskets or through a labyrinth-type seal. In addition, the support comprises pumping means associated to the supplementary chamber, which can be a) the pump associated to the ultra vacuum chamber and a conduit associated to the supplementary chamber or b) a separate pump for the supplementary chamber.

BRIEF DESCRIPTION OF THE FIGURES

With the object of helping to a better understanding of the features of the invention in accordance with a preferred example of practical implementation of the same, the following description is accompanied by a set of drawings wherein with illustrative character the following has been represented.

DETAILED DESCRIPTION OF THE INVENTION

Figure 1:
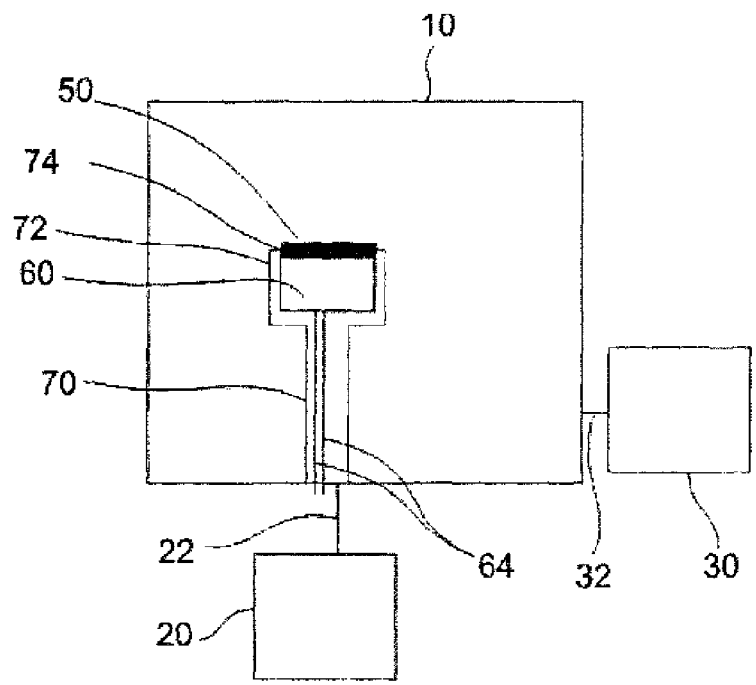
FIG. 1.—Scheme of the sample-support elements with the supplementary vacuum chamber and the separate pumping system.
Figure 2:
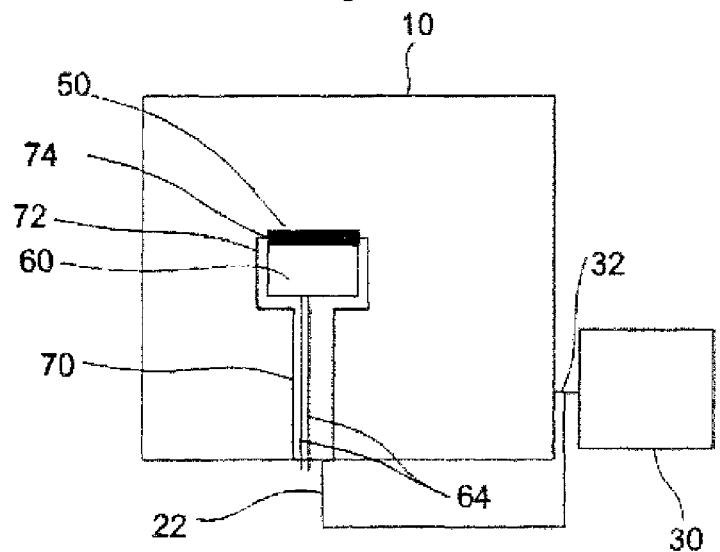
FIG. 2.—Scheme of the sample-support elements with the supplementary vacuum chamber and the shared pumping system.

A supplementary chamber 70 is located inside the ultra-high vacuums chamber 10. The supplementary chamber 70 is connected by one side to the ultra-high vacuums chamber and by the other side to the sample holder 60 such that in the volume of the ultra high vacuum chamber only the surface of the sample holder 50 on which the sample or the component to be studied/covered is placed, etc. is exposed. Other surfaces of the sample holder as well as the coolant conduits 64, the heating cables, the thermocouple wires and other elements necessary for the operation of the heating or cooling system of the sample holder are encapsulated inside the supplementary chamber 70. To prevent large pressure difference between the supplementary chamber and the ultra-high vacuums chamber and, furthermore, to prevent the diffusion of heat or cold through air by thermal conductivity and convection, the supplementary chamber is evacuated and preferably has a pressure of waste gases of the same order of magnitude as that of the ultra-high vacuums chamber, except during the periods of time when the pressure can rise as a result of the discharge of gases from the heater surfaces in the initial stage of its operation. The supplementary chamber is pumped through a pumping line 22 by an ultra-high vacuums pumping equipment 20 which can be separate from or shared with the pumping equipment of the ultra-high vacuums chamber 30. In the latter case the pumping line 22 is connected to the pumping line 32. The supplementary chamber 70 is connected to the ultra-high vacuums chamber by means of vacuum seals.

Figure 3:
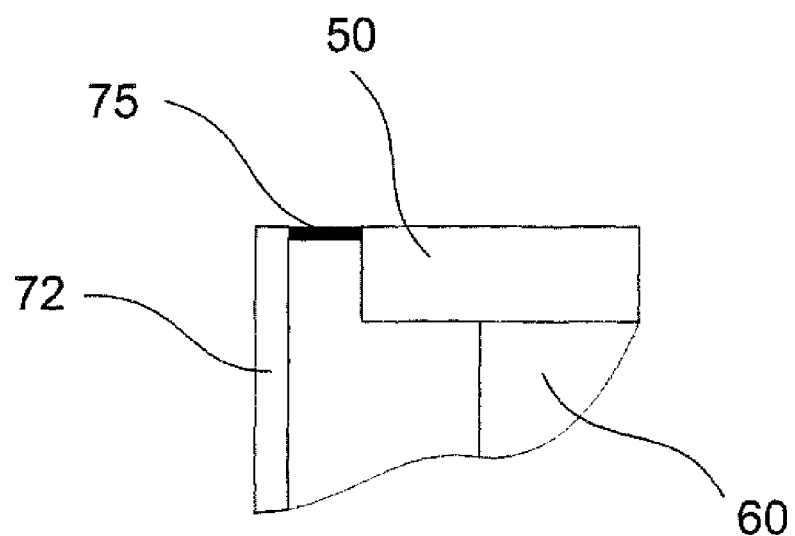
FIG. 3.—Section of the sample-support elements with the supplementary chamber and seal in the form of gasket made of material with low thermal conductivity.
Figure 4:
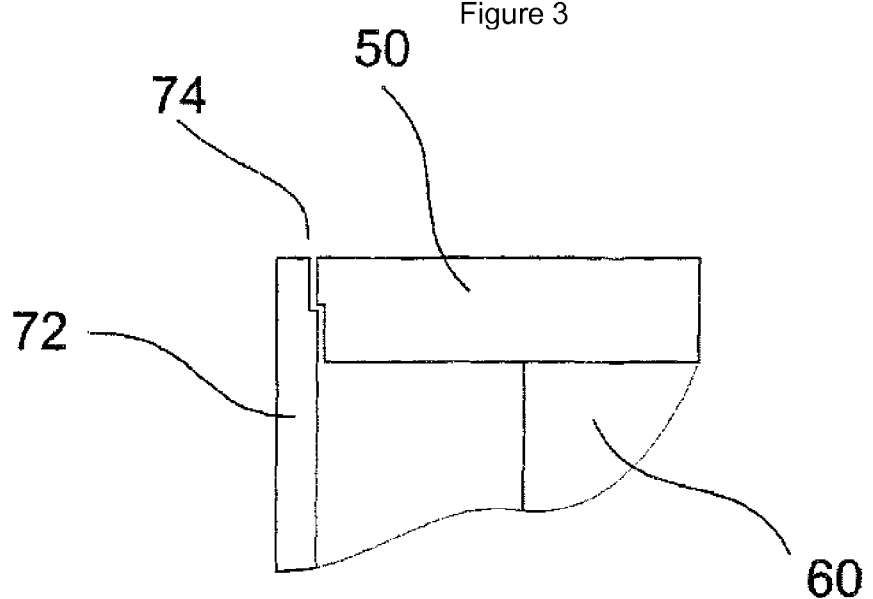
FIG. 4.—Section of the sample-support elements with the supplementary chamber and labyrinth-shaped seal.

The connection between the sample holder and the supplementary chamber has to prevent the passage of gases between the ultra-high vacuums chamber and the supplementary chamber and also prevent the transmission of heat or cold between the sample holder 50 and the wall of the supplementary chamber 72 (FIG. 3). For this purpose, gaskets 75 made of a low thermal conductivity material are used. For example, and without limiting the scope of the invention, the gasket can be manufactured of a polymer, thin sheet of stainless steel, ceramic or other suitable material. Another solution is to use the labyrinth-type seal (FIG. 4). The supplementary chamber is connected to the sample holder through a labyrinth channel 74 in such a way that there is no direct contact between the supplementary chamber and the hot or cold surfaces of the sample holder which prevents the transmission of cold or heat through thermal conductivity. The labyrinth channel is formed between the surface of the sample holder 60 and the surface of the supplementary chamber 72 and it usually has a thickness of less than one millimeter. Preferably, the labyrinth channel has one or more bends to reduce the conductance of the channel to the gases. The conductance of the labyrinth channel has to be usually less than 10 liters per second. Due to the low conductance of the labyrinth channel, the gases emitted from the hot surfaces of the sample holder are mainly evacuated by the pumping line 22 and do not significantly alter the residual atmosphere of the ultra-high vacuums chamber. The pumping equipment and the pumping line of the supplementary chamber must have the appropriate characteristics to ensure the pressure in the supplementary chamber of the same order of magnitude as in the ultra-high vacuums chamber. More specifically, the pumping speed of the supplementary chamber has to be several times greater than the conductance of the labyrinth channel.

The invention claimed is:

1. Sample-support element for ultra-high vacuums comprising:
   an ultra-high vacuums chamber;
   a supplementary chamber located inside the ultra-high vacuums chamber,
   a vacuum seal configured for connecting the supplementary chamber with the ultra-high vacuum chamber;
   a pumping means operatively connected to the supplementary chamber for pumping the supplementary chamber by an ultra-high vacuum pumping equipment, the pressure in the supplementary chamber being of the same order of magnitude as the pressure in the ultra-high vacuums chamber;
   a sample holder and elements for heating or cooling a sample;
   wherein the sample holder is surrounded by the supplementary chamber such that only the top surface of the sample holder where the sample is placed is in direct contact with the ultra-high vacuums chamber and the elements for heating or cooling the sample are encapsulated inside the supplementary chamber,
   and wherein each of the sample holder and the supplementary chamber further includes a respective mating surface arranged to define a labyrinth channel having at least one bend, the labyrinth channel being configured such that there is no direct contact between the mating surfaces of the supplementary chamber and the sample holder.

2. Sample-support element according to claim 1, wherein the pumping means comprise a pump associated with the ultra-high vacuum chamber, said pump being shared by the ultra-high vacuums chamber and the supplementary chamber, and a conduit associated with the supplementary chamber.

3. Sample-support element according to claim 1, wherein the pumping means comprise a first pump associated with the ultra-high vacuums chamber and a second pump associated with the supplementary chamber, and respective conduits through which the ultra-high vacuums chamber and the supplementary chamber are pumped.

* * * * *